United States Patent
Hartshorn et al.

(10) Patent No.: US 12,475,546 B1
(45) Date of Patent: Nov. 18, 2025

(54) SYSTEMS AND METHODS FOR MONITORING GOODS RELATIVE TO A STORAGE VESSEL

(71) Applicant: United Services Automobile Association (USAA), San Antonio, TX (US)

(72) Inventors: Joel S. Hartshorn, Port Orchard, WA (US); Elena Marie Carrasco, Converse, TX (US); Nathan Lee Post, Rockport, TX (US); Mark Paxman Warnick, San Antonio, TX (US); Ravi Durairaj, San Antonio, TX (US); Nolan Serrao, Plano, TX (US); Sumita T. Jonak, San Antonio, TX (US); Will Kerns Maney, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 445 days.

(21) Appl. No.: 17/936,121

(22) Filed: Sep. 28, 2022

Related U.S. Application Data (60) Provisional application No. 63/250,038, filed on Sep. 29, 2021.

(51) Int. Cl.
  *G06T 7/00* (2017.01)
  *B65G 1/02* (2006.01)
  *G06Q 10/087* (2023.01)
  *G06T 7/70* (2017.01)

(52) U.S. Cl.
  CPC ............ *G06T 7/0004* (2013.01); *B65G 1/02* (2013.01); *G06Q 10/087* (2013.01); *G06T 7/70* (2017.01); *G06T 2207/30128* (2013.01)

(58) Field of Classification Search
  CPC . G06V 20/68; G06T 2207/30128; G06T 7/00; G06T 7/70
  See application file for complete search history.

(56) References Cited

U.S. PATENT DOCUMENTS

| | | | |
|---|---|---|---|
| 2009/0294521 A1* | 12/2009 | de la Huerga | A61J 1/035 235/375 |
| 2013/0001109 A1* | 1/2013 | He | G01G 21/28 206/216 |
| 2015/0285775 A1* | 10/2015 | Gurumohan | G01D 11/24 702/187 |
| 2016/0057394 A1* | 2/2016 | Marutani | F25D 23/12 348/143 |
| 2016/0138857 A1* | 5/2016 | Klingshirn | F25D 29/00 62/130 |

(Continued)

OTHER PUBLICATIONS

Sharma et al., SmrtFridge: IoT-based, User Interaction-Driven Food Item & Quantity Sensing, Nov. 10, 2019, SenSys '19: Proceedings of the 17th Conference on Embedded Networked Sensor Systems, pp. 245-257, doi.org/10.1145/3356250.3360028.*

*Primary Examiner* — Guillermo M Rivera-Martinez
(74) *Attorney, Agent, or Firm* — Fletcher Yoder, P.C.

(57) ABSTRACT

A technique for monitoring stored goods using sensors and generating outputs, such as alerts, notifications, and the like, is provided. A storage monitoring system may identify a condition of a stored good based on data indicating storage conditions and handling conditions of the good. A storage assessment output is generated based on the identified condition of the stored good.

20 Claims, 3 Drawing Sheets

(56) References Cited

U.S. PATENT DOCUMENTS

| | | | |
|---|---|---|---|
| 2016/0203591 A1* | 7/2016 | Justaniah | F25D 29/00 |
| | | | 348/89 |
| 2019/0387375 A1* | 12/2019 | Gao | G06Q 10/087 |
| 2020/0003482 A1* | 1/2020 | Kim | G06Q 10/087 |
| 2020/0097776 A1* | 3/2020 | Kim | G06T 7/70 |
| 2020/0387122 A1* | 12/2020 | Jepperson | G06F 16/22 |
| 2021/0049775 A1* | 2/2021 | Ryu | G06V 20/52 |
| 2021/0192329 A1* | 6/2021 | Shin | F25D 29/00 |
| 2021/0262725 A1* | 8/2021 | Hong | F25D 25/00 |
| 2023/0046713 A1* | 2/2023 | Daniol | G16H 40/20 |

* cited by examiner

SYSTEMS AND METHODS FOR MONITORING GOODS RELATIVE TO A STORAGE VESSEL

CROSS-REFERENCE TO RELATED APPLICATION

The present application claims priority to and the benefit of U.S. Provisional Patent Application Ser. No. 63/250,038, titled "Systems and Methods for Storage Monitoring" which was filed on Sep. 29, 2021, and which is herein incorporated by reference in its entirety for all purposes.

BACKGROUND

The present disclosure relates generally to monitoring stored goods such as food, materials, clothing, and the like. More specifically, the present disclosure relates to using data to inform and/or automate decisions related to a condition of the stored goods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Certain goods, such as perishable foods or medicine, may have a relatively short or limited shelf life (e.g., less than 1 or 2 days, less than 1 week, less than 2 weeks, less than 1 month, less than 1 year, or less than 2 years). Further, the shelf life may vary based on the conditions (e.g., amount of handling, temperature) in which the goods are stored, transported, packaged, and re-packaged. As such, it may be difficult for a user (e.g., a person cooking perishable foods, a store selling the goods with the relatively short shelf life, or a restaurant owner) to accurately determine how long the goods may be used upon receiving it. It is now recognized that there is a need to improve the monitoring of stored goods.

SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system. The system includes a processor and a tangible, non-transitory, computer-readable medium, comprising instructions that cause the processor to receive an indication of a good being added to a storage vessel of a storage device. The instructions also cause the processor to acquire data from the one or more sensors indicating storage conditions, handling conditions, or both, related to the good added to the storage vessel. Further, the instructions cause the processor to determine a shelf life of the good based on the data indicating the storage conditions, the handling conditions, or both. Even further, the instructions cause the processor to generate a storage assessment output based on the shelf life. Further still, the instructions cause the processor to provide the storage assessment output to a computing device associated with the storage device.

In one embodiment, the present disclosure relates to a method. The method includes identifying, via a processor, a good stored in a storage vessel. The method also includes outputting, via the processor, a control signal that causes one or more sensors to acquire data indicating storage conditions, handling conditions, or both, related to the good stored in the storage vessel. Further, the method includes assessing a condition of the good based on the storage conditions, the handling conditions, or both. Even further, the method includes generating, via the processor, a storage assessment output based on the condition of the good. Further still, the method includes providing, via the processor, the storage assessment output to a computing device of a user associated with the storage device.

In one embodiment, the present disclosure relates to a system. The system includes one or more sensors configured to measure data indicating storage conditions and handling conditions associated with a good stored in a storage vessel. The system also includes a processor and a tangible, non-transistor, computer readable medium, comprising instructions that cause the processor to receive an indication of a lid associated with the storage vessel being removed from the storage vessel. The instructions also cause the processor to output, via the processor, a control signal that causes the one or more sensors to measure data subsequent to receiving the indication. Further, the instructions cause the processor to determine a handling condition of the good based on the data. Even further, the instructions cause the processor to generate, via the processor, a storage assessment output based on the handling condition of the good and the storage conditions. Further still, the instructions cause the processor to transmit, via the processor, a control signal causing a device to provide visual feedback, audible feedback, or both, indicative of the storage assessment output.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, certain goods, such as perishable foods or medicine, may have a relatively short shelf life. For example, even when stored in a properly conditioned space or storage (e.g., a climate controlled room or refrigerator), certain goods may expire after a limited time. While these goods may be provided with an expiration date, such as having a label indicating a "best if used by," or a "sell by" date that estimates the shelf life of a perishable good, the actual shelf life may be shorter or longer depending on handling or storage conditions (e.g., a duration of handling, a temperature of a location where the perishable good was handled outside of a package or outside of conditioned storage, a number of times the perishable good was handled) and/or storage conditions (e.g., a temperature of the storage vessel and/or room(s) where the vessel is stored, a humidity level of the storage vessel and/or the room(s), an amount of light received by the storage vessel and/or the room(s)) while the perishable good is stored, transported, packaged, and re-packaged. For example, meat received by a grocery store may undergo handling during processing steps (e.g., cutting, weighing, seasoning, handling, marinating) before the meat, or a portion of the meat, is sold at the grocery store. If the handling conditions are outside of expected handling conditions (e.g., the meat is kept out of a desired temperature range beyond a period of time), the shelf life of the perishable good may decrease. Moreover, each additional processing step may further decrease the shelf life of the perishable good. As such, the "best if used by," may be relatively longer or shorter (e.g., less than a week shorter, less than two days short, one day shorter) than the label indicates.

In any case, the user may not realize that the goods are spoiled until after the user has opened a package containing the good (e.g., performing a smell or visual inspection) or after the user has consumed the good, either of which may result in certain inconveniences to the user. Furthermore, monitoring information about the stored goods, such as a location of stored goods (e.g., a particular container storing a good, a room or building in which the container is stored), may be inefficient for a user due the number of stored goods the user owns as well as the number of containers storing the stored goods. For example, a user may label a box with a general indication of the contents of the box and/or a storage date, however, the user may still have to search within the box to find a desired good. Accordingly, the present disclosure is directed to a storage monitoring system that improves the efficiency of managing stored goods.

In some embodiments, storage assessment output of the disclosed storage monitoring system may be provided to an entity, such as an insurance company, a food distributer, or a food producer to improve operations. For example, the storage assessment output may provide food loss information to an insurance company after an unplanned event resulting in food loss has occurred. The food loss information may include a mass, a volume, an estimated dollar amount based on prices of a nearby grocery store, an estimated amount based on a credit card or bank statement of a user to help the insurance company evaluate a reimbursement to provide the user for food loss. As another non-limiting example, the storage assessment output may provide information to a food distributer or food producer indicating that previous handling conditions or previous storage conditions decreased the shelf life of the stored good or potentially introduced unwanted bacteria into the stored good. As such, the information may help the food distributer or food producer determine whether certain processing steps were performed in an unexpected or incorrect manner. Further, the information may help the food distributer or food producer determine whether to recall stored goods originating from a similar batch or storage facility.

Figure 1:
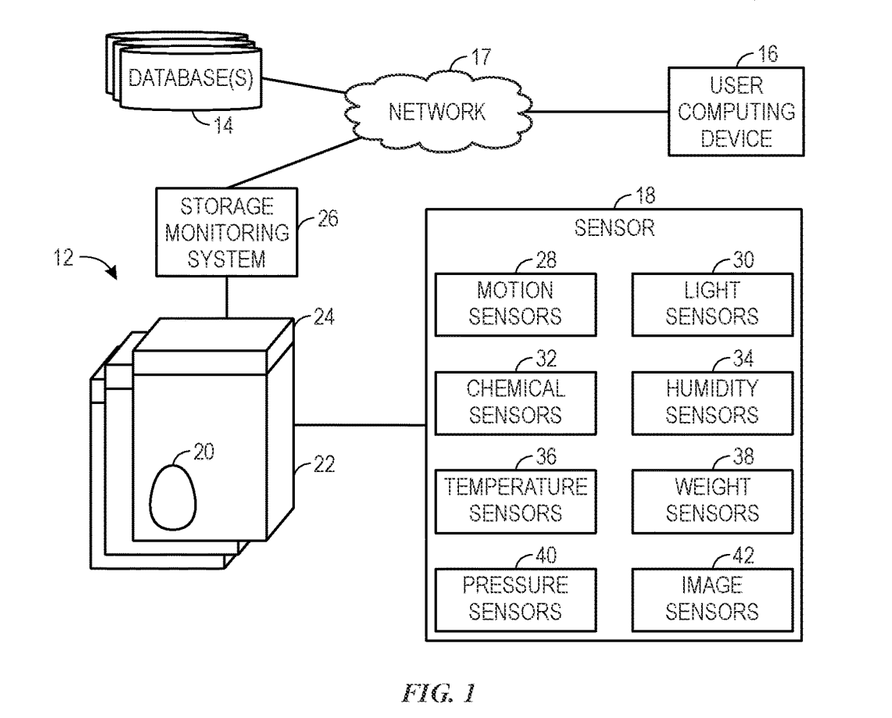
FIG. 1 illustrates a block diagram of a storage monitoring system, in accordance with embodiments described herein.

By way of introduction, FIG. 1 is a block diagram of a system 10 that includes smart storage devices 12, databases 14, and user computing devices 16, which may be communicatively coupled over a network 17. In general, the smart storage devices 12 include (e.g., disposed inside of, disposed on an inner wall, disposed on an outer wall) one or more sensors 18 that detect, measure, or acquire data indicative of storage conditions and/or handling conditions of a stored good 20 (e.g., perishable items such as food and medicine, or material goods such as clothing, tools, jewelry, electronics) within a storage vessel 22 or handled outside of the storage vessel 22 and subsequently stored in the storage vessel 22.

As referred to herein, "storage conditions" may include measured properties of the good 20 (e.g., a weight, a size, a color, a texture, a presence of a chemical released by a perishable good as it ripens or spoils), properties of the storage vessel 22 (e.g., an occupied volume and/or an unoccupied volume available for storage), properties within or outside of the storage vessel 22, such as temperature measurements, humidity measurements, an internal pressure within the storage vessel 22, and the like. As referred to herein, "handling conditions" may include measurements indicating how the good 20 and/or the storage device 12 was handled, such as a time period where a lid 24 of the storage device 12 was removed from the storage vessel 22, a frequency at which the storage vessel 22 was left opened, an occurrence of the lid 24 being opened, and an orientation of the storage device 12 (e.g., was the box maintained in accordance with a "this side up" sign).

The sensors 18 are communicatively coupled to a storage monitoring system 26 having a processor that receives the data and determines the storage conditions and/or handling conditions and generates a storage assessment output, such as an alert for a user that a shelf life of the stored good is earlier or later than an expected shelf life (e.g., a "best if used by" date, a "sell by" date), an automatic purchase of a replacement good (e.g., using a third party application), a visual or audio indication presented using the storage device 12 (e.g., using an integral display or speaker of storage device 12) to help the user identify issues with the stored good 20, and the like as discussed in more detail herein. In some embodiments, one or more of the sensors 18, one or more of the storage vessels 22, one or more of the lids 24, and the storage monitoring system 26 may be provided as a single unit. For example, the sensors 18 may be disposed on or integrated within inner walls of a particular storage vessel (e.g., one of the storage vessels 22) and/or a corresponding lid (e.g., one of the lids 24). For example, in an embodiment where the sensors 18 are disposed on the lid 24, the lid 24 may include sensors 18 in a position capable of measuring conditions of the interior of the storage vessel 22 such that sensors 18 may measure data within the storage vessel 22.

In some embodiments, the lid 24 may be a housing for the storage monitoring system 26. Further, in some embodiments, the smart storage device 12 may not include a dedicated storage vessel 22. For example, the lid 24 may house the storage monitoring system 26, while the sensors 18 are either integrated with the lid 24, disposed on the lid 24, or communicatively coupled to the lid 24 (e.g., via a wired connection or wireless connection), and the lid 24 may function with various different containers. For example, the lid 24 may include suitable dimensions and threading to fit on certain jars, jugs, or sealable containers. As such, the storage monitoring system 26 may be retrofitted onto jars, storage bins, and the other containers, when the lid 24 is configured to fit on top of the containers.

In some embodiments, the sensors 18 and the storage monitoring system 26 may be implemented with a transportation mechanism, such as a robot configured to move about a movement path within certain areas where goods are stored (e.g., a refrigerator or a freezer). For example, the robot (which may include or be integrated with the sensors 18) may periodically identify and monitor stored goods in a freezer while moving about the movement path to establish information about the goods. The robot may then store the information about the identified stored goods or monitored stored goods in a memory or transmit the information to the user computer device 16 for display.

The sensors 18 include devices capable of measuring data indicative of the storage conditions and/or the handling conditions related to storage and/or use of the good 20. For example, the sensors 18 may include motion sensors 28, light sensors 30, chemical sensors 32, humidity sensors 34, temperature sensors 36, weight sensors 38, pressure sensors 40, and image sensors 42 (e.g., camera, video recording device, and the like). For example, motion sensors (e.g., gyroscope or accelerometers) may acquire data indicating that a lid of the storage vessel 22 was removed. As another non-limiting example, chemical sensors may acquire data indicating a change in concentration or amount of one or more gases associated with food spoilage (e.g., sulfur-containing gases such as sulfur dioxide ($SO_2$), methane, nitrogen-containing gases such as ammonia and trimethylamine). Light sensors may acquire data indicating that a lid of the storage vessel 22 was removed based on, for example, an increase in light within a previously dark (e.g., having a relatively low amount of direct light) storage vessel 22 and being detected by the light sensors. In any case, the data acquired by the sensors may include timestamps, which may facilitate determining or estimating certain handling conditions, such as a duration for which a good was outside of the storage vessel 22.

Additionally, the storage monitoring system 12 may receive data from the sensors 18 and query the databases 14 or other storage component based on the data to retrieve additional data to generate a storage assessment output. For example, the database 14 may store images (e.g., provided by the user) associated with goods the user may regularly purchase and the storage monitoring system 12 may utilize these images to identify stored goods based on comparisons between the stored images and images acquired by imaging sensors 42. For example, a user may submit identification data via the user computing device 16 that may be used to identify the stored good 20. For example, the identification data may be an image of the stored good, an image of a logo of a company associated with the stored good (e.g., a brand name), and the like. Additionally, the database 14 may include data associated with the goods (e.g., federal guidelines for shelf-life of raw or cooked foods) that may be used by the storage monitoring system 26 to determine if a shelf life is reduced based on data indicating utilization of a good. For example, the database 14 may include time data associated with an average time of storing a perishable good after opening that may be used to determine an updated shelf life. As another example, the database 14 may include images indicating a ripeness of a fruit that may be used by the storage monitoring system 26 to determine a ripeness of a stored fruit.

Keeping the foregoing in mind, the smart storage devices 12 may assist users in a number of scenarios. For example, a user may store a perishable good in the smart storage device 12, and the user may desire an updated shelf life of the perishable good based on data indicating the storage conditions or handling conditions of the stored good. As such, the storage monitoring system 26 may utilize data acquired by sensors 18 to determine the shelf life. As another non-limiting example, the user may desire to know a history of the storage conditions and/or handling conditions of the stored good 20 before it was stored in a smart storage device 12 owned by the user. As such, the smart storage device 12 may include suitable communication components (e.g., RFID device or input device) which may facilitate the transfer of data indicating historical storage conditions and/or handling conditions. For example, an RFID device on a storage device that previously stored the stored good 20 may transfer the data to the smart storage device 12 upon being brought into a communication range of an RFID reader of the storage monitoring system 26. As another example, the storage device 12 may allow input via an integral keyboard, an integral microphone, wireless communication, or the like (e.g., data entered into a smart device application and transmitted to the storage device 12 via a nearfield communication). In this way, by facilitating the transfer of data between different devices, an organization or enterprise may readily integrate the smart storage device 12 into their supply chain. As another non-limiting example, the smart storage device 12 may facilitate a user tracking an availability, an existence, or a location of the stored goods. As such, the smart storage device 12 may periodically, or upon receiving a user query, output notifications on a user's mobile device that indicates information related to the availability, the existence, or the location of the stored goods. As another non-limiting example, the smart storage device 12 may be capable of automatically identifying additional storage goods the user may desire to use (i.e., although the user may not have specifically requested for the item) and facilitate the user using the additional stored goods by, for example, outputting control signals to cause a lock to unlock that is fitted on smart storage devices 12 or other storage containers, causing an audible indicator or visual indicator (e.g., display or light emitting diode (LED) on the smart storage device 12) on the smart storage device 12 to activate to make the smart storage device 12 more readily detectable by the user, outputting a notification indicating a location of the additional stored goods (e.g., an address of a storage facility, a name specified by the user indicating a storage location), or any combination thereof.

Figure 2:
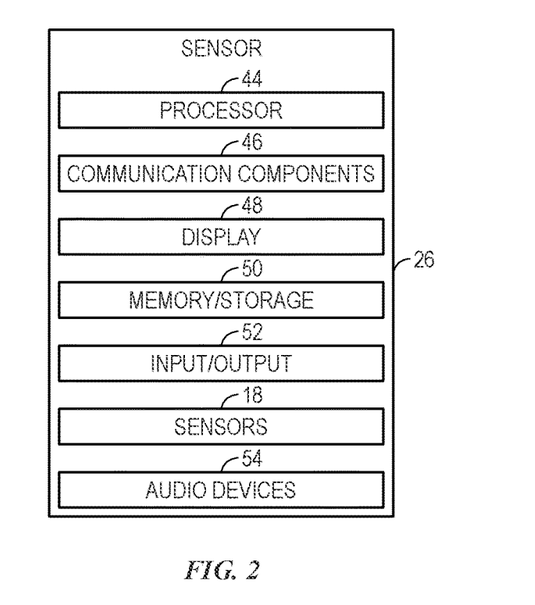
FIG. 2 illustrates a block diagram of a computing system that may be used in conjunction with the system of FIG. 1, in accordance with embodiments described herein.

To perform one or more operations described herein, the storage monitoring system 26 may include various types of components that may assist the storage monitoring system 26 in performing the operations described below. For example, as shown in FIG. 2, the storage monitoring system 26 may include a processor 44, a communication component 46, a display 48, memory/storage 50, an input/output (I/O) port 52, and the like to facilitate performing algorithms in accordance with present embodiments. Additionally, the storage monitoring system 26 may include or be communicatively coupled to the sensors 18 or audio devices 54.

The processor 44 may be any type of computer processor or microprocessor capable of executing computer-executable code. The processor 44 may also include multiple processors that may perform the operations described below. The communication component 46 may be a wireless or wired communication component that may facilitate communication between the storage monitoring system 26, the databases 14, and various other computing systems via the network 17, the Internet, or the like. The display 48 may depict visualizations associated with software or executable code being processed by the processor 44. In one embodiment, the display 48 may be a touch display capable of receiving inputs from a user of the storage monitoring system 26. The display 48 may be any suitable type of display, such as a liquid crystal display (LCD), plasma display, or an organic light emitting diode (OLED) display, for example. Additionally, in one embodiment, the display 48 may be provided in conjunction with a touch-sensitive mechanism (e.g., a touch screen) that may function as part of a control interface for the storage monitoring system 26.

The memory and the storage 50 may be any suitable articles of manufacture that can serve as media to store processor-executable code, data, or the like. These articles of manufacture may represent computer-readable media (e.g., any suitable form of memory or storage) that may store the processor-executable code used by the processor 44 to perform the presently disclosed techniques. As used herein, applications may include any suitable computer software or program that may be installed onto the storage monitoring system 26 and executed by the processor 44. The memory and the storage 50 may represent non-transitory computer-readable media (e.g., any suitable form of memory or storage) that may store the processor-executable code used by the processor 44 to perform various techniques described herein. It should be noted that non-transitory merely indicates that the media is tangible and not a signal. The I/O ports 52 may be interfaces that may couple to other peripheral components such as input devices (e.g., keyboard, mouse), the sensors 18, audio devices 54, input/output (I/O) modules, and the like. The audio devices 54 may include microphones or other audio input devices capable of receiving verbal queries or commands from a user. For example, the verbal queries may be directed to identifying a location of stored goods or queries regarding a condition of stored goods, such as 'where is my heart medication?', 'where are my winter clothes stored?', 'are the vegetables ripe?', and 'how many boxes only contain frozen strawberries?'. For example, the commands may be directed to facilitating the user locating a stored good or purchasing replacements of stored goods, such as 'show me where the winter clothes are stored', and 'order more 2% milk if it has expired.' Additionally, the audio devices 54 may be capable of receiving audio input by a user that may later facilitate the user finding the stored good, such as 'this box is storing my computer cables,' 'I am storing box A in my secret hiding spot,' and the like. In any case, the audio device 54 may be capable of receiving audible commands and parsing the information that may be used for subsequent queries for the stored goods.

In addition to the storage monitoring system 26, the user computing device 16, as well as other suitable computing devices described herein may include the components described above for the storage monitoring system 26. It should be noted that the components described above with regard to the storage monitoring system 26 are exemplary components and the storage monitoring system 26 may include additional or fewer components than shown.

The system 10 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by special purpose logic circuitry, e.g., an FPGA (field programmable gate array), an ASIC (application specific integrated circuit), or the like. Further, apparatuses may also be employed to implement disclosed processes and logic flows in accordance with present embodiments.

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI (user interface) or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Included in the system is a user computing device 16 from which the initial query regarding a stored good 20 may be submitted. Additionally, the user computing device 16 may be used for displaying notifications and/or alerts generated by the storage monitoring system 26. The user computing device 16 may be a general-purpose personal computer, a laptop computer, a tablet computer, a mobile computer, a mobile device (e.g., cell phone), etc. The storage monitoring system 26 may be in communication with the user computing device 16 and configured to receive the initial query via an interface of the user computing device 16.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

With the foregoing in mind, FIGS. 3-6 illustrate flow diagrams of methods that may be performed by the storage monitoring system 26 (e.g., via the processor 44), for example, to aid users in various scenarios relating to monitoring and maintaining stored goods.

Figure 3:
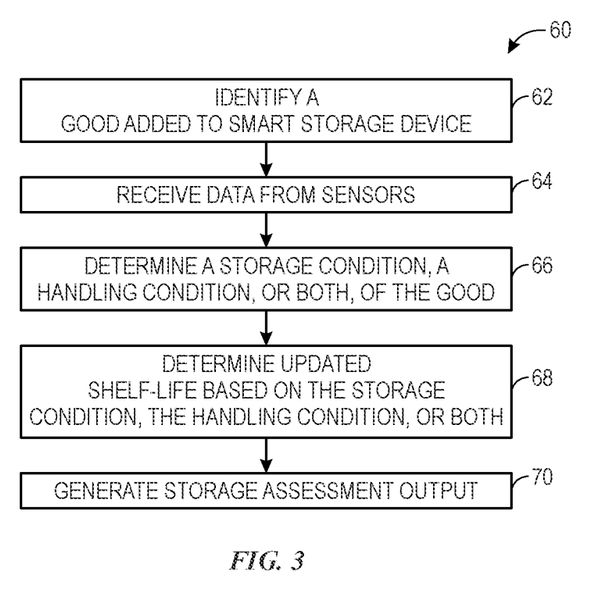
FIG. 3 illustrates a flow diagram for generating a storage assessment output related to a stored good based on handling condition data and storage condition data, in accordance with embodiments described herein.

FIG. 3 illustrates an example process 60 that may be employed by the smart storage device 12 to generate a storage assessment output based on storage data measured by the sensors 18, in accordance with embodiments described herein. For example, the steps of the process 60 may be stored in the memory/storage 50. Before proceeding, it should be noted that the process 60 described below is described as being performed by the processor 44 of the storage monitoring system 26, but the process 60 may be performed by other suitable computing devices. Although described in a particular order, which represents a particular embodiment, it should be noted that the process 60 may be performed in any suitable order. Additionally, embodiments of the process 60 may omit process blocks and/or include additional process blocks.

Referring now to FIG. 3, at block 62, the processor 44 may identify a good added to the smart storage device 12 by a user. In general, the processor may identify the good using a measurement by the sensors 18 or based on an input (e.g., user input). For example, the processor 44 may receive image data from an imaging sensor 42 and determine that the image data includes the good. This may be done, for example, by identifying a code (e.g., barcode, QR code, or otherwise) in the image and correlating the code with a good or by using object-based image analysis which identifies goods by comparing objects identified in the image with reference images stored in the database 14. In some embodiments, the processor may cause the image sensor 42 to acquire the image data used to identify the good after another sensor indicates that the storage vessel has been opened. For instance, if the smart storage device includes a motion sensor and image sensor, data acquired by the motion sensor may be used to determine when the storage vessel has been opened. Further, when the data acquired by the motion sensor indicates the storage vessel has been opened (e.g., if the processor determines that the data exceeds a motion threshold or matches a pattern of movement data indicative of a lid being removed based on rotations of screw cap), the processor may output a control signal that causes the image sensor to acquire an image of the contents of the storage vessels. In any case, the processor 44 may also retrieve reference data associated with the added good upon identifying the good. For example, the processor 44 may retrieve data indicating a shelf life of the good in one or more circumstances (e.g., shelf life after cooking the good, shelf life after opening the good, shelf life of the good under certain temperature conditions). In some embodiments, the processor 44 may also identify a shelf life based on input (e.g., user input) or by identifying the shelf life presented on a label on the good.

In some embodiments, the processor 44 may identify a position of the good within a smart storage device 12. For example, the processor 44 may determine relative dimensions of the storage vessel 22 (e.g., based on user input, based on stored data within database 14, based on a measurement). As such, the position may include x-y coordinates, a relative position of the good (e.g., on the bottom of the storage vessel 22). In an embodiment where multiple items are identified at block 62, the processor 44 may also determine a relative arrangement of the items based on sensor data (e.g., based on the relative order in which the goods were added into the storage vessel 22).

At block 64, the processor may acquire data from sensors 18 communicatively coupled to the storage monitoring system 26. For example, the processor may send suitable signals (e.g., control signals) to instruct the sensors 18 to acquire data (e.g., audio data, video data, image data, and the like) after the good is added to the container. The sensors 18 may acquire data continuously or in predetermined time increments (e.g., 5 minutes, 10 minutes, 30 minutes, 1 hour, etc.) This data may be assembled into historical information that shows various conditions detected over time.

At block 66, the processor 44 may determine a storage condition, a handling condition, or both, using the acquired data from the sensors 18. As described herein, "storage conditions" may include measured properties of the good 20 (e.g., a weight, a size, a color, a texture, a presence of a chemical released by a perishable good as it ripens or spoils), properties of the storage vessel 22 (e.g., an occupied volume and/or an unoccupied volume available for storage), properties within or outside of the storage vessel, such as temperature measurements, humidity measurements, an internal pressure within the storage vessel, and the like. Further, as noted above, the storage conditions may cumulatively indicate a history of such conditions. For example, to determine the storage condition, the processor 44 may determine based on temperature data acquired by the temperature sensors 36 and timestamps associated with the temperature data that the stored item remained in an environment within a recommended temperature range while within the storage vessel 22. As such, the storage condition may be a string (e.g., 'good', 'fair', or 'bad'), numerical indication (e.g., a scale of 1-100 where 100 indicates that good was stored properly over 99% of the time that the good was within the storage vessel 22), or binary indication (e.g., '1' for stored properly, '0' for not properly) indicating whether or not the good was stored properly.

As described herein, "handling conditions" may include measurements indicating how the good 20 and/or the storage device 12 was handled, such as a time period where a lid 24 of the storage vessel was removed from the storage vessel 22, a frequency at which the storage vessel 22 was left opened, an occurrence of the lid 24 being opened, and an orientation of the storage device 12 (e.g., was the box maintained in accordance with a "this side up" sign). For example, to determine the storage condition, the processor 44 may receive a first data that indicates the lid 24 was opened, receive a second data that indicates an amount of the good that was removed (e.g., based on data acquired by a weight sensor), and/or a third data that indicates the good was returned to the storage vessel 22 and/or the lid 24 was closed. As such, the processor 44 may determine a time duration at which the good was removed from the storage vessel 22 and/or an amount of the good that was not used, and subsequently determine handling conditions. Again, this may include cumulative data that indicates timeframes for conditions or cumulative conditions. For example, the handling conditions may indicate whether or not the good was left out too long, whether the lid was left opened beyond a time duration, or both. These determined conditions may be reflective of one event or an accumulation of events.

At block 68, the processor 44 may determine an updated shelf life of the good based on the storage condition, the handling condition, or both. In general, the processor may 44 modify (e.g., increase or decrease) based on whether the storage condition, the handling condition, or both complied with or deviated from expected or recommended storage conditions and/or handling conditions.

At block 70, the processor 44 may generate a storage assessment output based on the updated shelf life. In some embodiments, the storage assessment output may be an alert and/or notification that indicates the change in the updated shelf life relative to the original shelf life. In some embodiments, the storage assessment output may provide a recommendation to a user to replace the stored item when the updated shelf life indicates that the good may be spoiled or is otherwise undesirable for consumption. In some embodiments, the storage assessment output may be an automatic purchase of a replacement for the good, when the updated shelf life indicates that the good may be spoiled or is otherwise undesirable for consumption.

In some embodiments, the storage assessment output may be provided to a separate entity (e.g., not the owner of the smart storage device 12), such as an insurance company, a food distributer (e.g., a grocery store, a gas station, a bodega, and the like), or a food producer (e.g., a company associated with a farm or factory where the good is produced). For example, the storage assessment output may provide food loss information to an insurance company after an unplanned event resulting in food loss has occurred (e.g., a power outage for a prolonged period of time during or after a natural disaster, such as a hurricane or ice storm). The food loss information may include a mass, a volume, an estimated dollar amount based on prices of a nearby grocery store, an estimated amount based on a credit card or bank statement of a user to help the insurance company evaluate a reimbursement to provide the user for food loss. As another non-limiting example, the storage assessment output may provide information to a food distributer or food producer indicating that previous handling conditions or previous storage conditions decreased the shelf life of the stored good or introduced unwanted bacteria into the stored good. As such, the information may help the food distributer or food producer determine whether certain processing steps were performed in an unexpected or incorrect manner. Further, the information may help the food distributer or food producer determine whether to recall stored goods originating from a similar batch or storage facility.

In some embodiments, the storage assessment output may include a recommendation and/or information (e.g., the storage conditions, the handling conditions, time stamps associated with the data, or any combination thereof) to a user to modify one or more storage conditions, one or more handling conditions, or both, to improve the shelf life of the good. For example, the processor 44 may determine a storage condition indicating that a first produce is within a threshold distance of a source of ripening agents (e.g., a banana emitting ethylene, calcium carbide that produces acetylene when the calcium carbide reacts with moisture). As such, the storage assessment output may include a recommendation to the user to move the first produce outside of a threshold distance from the source of ripening agents. As another non-limiting example, the processor 44 may determine a handling condition indicating that a temperature of a good has exceeded a threshold temperature associated with preventing spoilage of the good. As such, the storage assessment output may include a recommendation to decrease an external temperature where the good is handled or processed and/or a warning indicating that the duration the good is processed should be decreased. In this way, the storage assessment output may be beneficial for improving the efficiency of operations performed by home owners, food distributors, and/or food storage facilities by providing the users with measured data and/or patterns that may be difficult to measure or otherwise unavailable. That is, the storage assessment output may help users determine operations to modify to improve the shelf life of stored goods.

Figure 4:
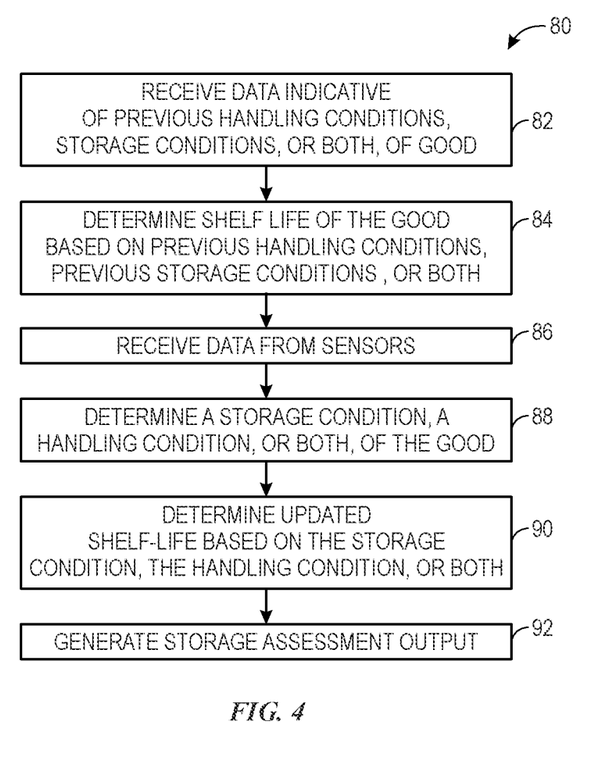
FIG. 4 illustrates a flow diagram for determining a storage assessment output related to a stored good based on previous handling condition data and previous storage condition data, in accordance with embodiments described herein.

FIG. 4 illustrates an example process 80 that may be employed by the smart storage device 12 to generate a shelf life assessment output based on received data indicative of historical storage conditions and handling conditions, in accordance with embodiments described herein. For example, the steps of the process 80 may be stored in the memory/storage 50. Before proceeding, it should be noted that the process 80 described below is described as being performed by the processor 44 of the storage monitoring system 26, but the process 80 may be performed by other suitable computing devices (e.g., a centralized computer system in communication with the storage device 12). Although described in a particular order, which represents a particular embodiment, it should be noted that the process 80 may be performed in any suitable order. Additionally, embodiments of the process 80 may omit process blocks and/or include additional process blocks.

Referring now to FIG. 4, at block 82, the processor 44 may receive data indicative of previous handling conditions, previous storage conditions, or both, of a good added, or to be added to a smart storage device 12. In general, the data may include a location of origin of the good, a date the good was shipped (e.g., indicating how long the good was in storage), weather conditions in which the good was shipped (e.g., indicating temperatures the good may have been exposed to, whether the good may have at least partially melted, such as in the case of a frozen good), and the like. In some embodiments, the processor 44 may receive the data based on user input or from data transmitted during near-field communication (NFC) with another device, such as tapping a previous storage container with the smart storage device 12 to places the respective NFC communication devices of the previous storage container and the smart storage device 12 within a communication range to provide transmission of the data. In some embodiments, the data may be weight data from palettes used to move a shipping container that included the good. It should be noted that other measurements to be used for the data may include an indication of breakage (e.g., a drop in pressure of a pressurized container, a decrease in weight), an indication of whether the object's orientation was changed relative to a preferred orientation (e.g., 'this side up'). In some embodiments, the data may be transferred by scanning universal product codes (UPCs) provided on the good of a container used to ship the good.

At block 84, the processor 44 may determine a shelf life of the good based on the previous handling conditions, the previous storage conditions, or both. In general, the processor 44 may determine whether an expected shelf life of the good should be modified. For example, a good that is shipped frozen may have expected shelf life that represents an estimated amount of time that the good will remaining at a certain quality level after the item has been defrosted. However, if the previous storage data, the previous handling data, or both, indicate that the good was not frozen during shipping, the processor 44 may determine the shelf life taking into account the amount of time that the good was not frozen. At least in some instances, if the processor 44 determines that the previous handling conditions, the previous storage conditions, or both, indicate the good is spoiled, the process 80 may proceed directly to block 92 and output a storage assessment output.

At block 86, the processor 44 may receive data from sensors of the smart storage device 12 in a generally similar manner as described with respect to block 64 of process 60. At block 88, the processor 44 may determine storage conditions, handling conditions, or both based on the received data in a generally similar manner as described with respect to block 66 of process 60. At block 90, the processor 44 may determine the updated shelf life based on the storage condition, handling condition, or both, in a generally similar manner as described with respect to block 68 of process 60. It should be noted that the updated shelf life may be determined based on the previous storage conditions, the previous handling conditions, or both (e.g., received at block 82). At block 92, the processor 44 may generate a storage assessment output in a generally similar manner as described with respect to block 70 of process 60. It should further be noted that the processes depicted in FIGS. 3 and 4 may be combined in accordance with present embodiments.

Figure 5:
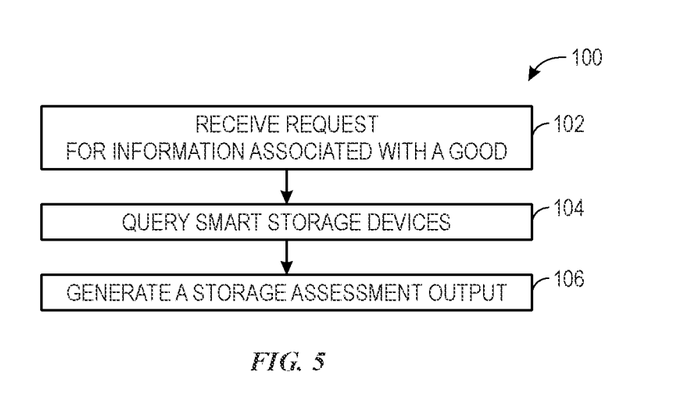
FIG. 5 illustrates a flow diagram for generating a stored good assessment output based on a query related to a stored good, in accordance with embodiments described herein.

FIG. 5 illustrates an example process 100 that may be employed by the smart storage device 12 to generate a shelf life assessment output based a received request for information provided by the user, in accordance with embodiments described herein. For example, the steps (or instructions) of the process 100 may be stored in the memory/storage 50. Before proceeding, it should be noted that the process 100 described below is described as being performed by the processor 44 of the storage monitoring system 26, but the process 100 may be performed by other suitable computing devices. Although described in a particular order, which represents a particular embodiment, it should be noted that the process 100 may be performed in any suitable order. Additionally, embodiments of the process 100 may omit process blocks and/or include additional process blocks.

Referring now to FIG. 5, at block 102, the processor 44 may receive a request for information regarding one or more goods 20. For example, the request may be a verbal request received via the audio device 54 of the storage monitoring system 26 or an audio device coupled to the storage monitoring system 26 or user computing device 16. In some embodiments, the request may be generated based on a text-based input or selection of an item from a list of stored goods received via a user computing device 16. In general, the request may indicate one or more particular goods that the user desires to use, a request for a condition of the one or more particular goods, or both.

At block 104, the processor 44 may query one or more smart storage devices 12, the database 14, or both, for an answer to the request for information. For example, if the request is for a location of a good, the processor 44 may query the smart storage devices 12 to determine a particular smart storage device 12 that is storing the good. Additionally, or alternatively, the processor 44 may query a smart storage device 12 that includes a good to determine a location of the good within the storage vessel 22. The location may include a relative position (e.g., on the top, disposed between two additional goods, a distance from the lid 24 or one or more walls of the storage vessel 22), x-y coordinates, and the like. As another non-limiting example, if the request is for a condition of one or more stored goods, such as whether a dosage of a medicine was taken, the processor 44 may receive data acquired by the sensors 18 indicative of handling conditions associated with the good (e.g., whether the medicine was removed from the smart storage device 12, whether a total mass of the medicine decreased).

At block 106, the processor 44 may generate a storage assessment output. In this embodiment, the storage assessment output generally provides an answer to the request for information. For example, the storage assessment output may be a notification to the user of a location of the stored good (e.g., an address of a storage facility where the good is stored, a location within a smart storage device 12 where the good is stored). An example of the storage assessment output may indicate the condition of the good (e.g., a message such as 'the food is spoiled-do not use', 'a replacement of the good has been ordered,' or 'the medicine dosage appears to have been taken').

Figure 6:
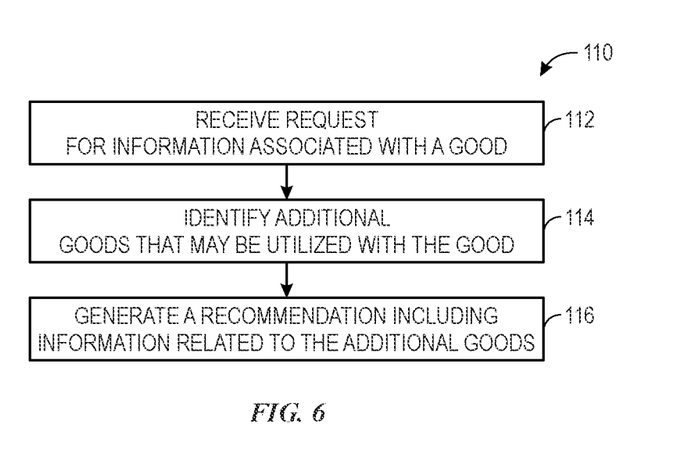
FIG. 6 illustrates a flow diagram for identifying additional goods based on a query related to a stored good, in accordance with embodiments described herein.

FIG. 6 illustrates an example process 110 that may be employed by the smart storage device 12 to provide recommendations to the user using information associated with goods stored in the smart storage devices 12, in accordance with embodiments described herein. For example, the steps of the process 110 may be stored in the memory/storage 50. Before proceeding, it should be noted that the process 110 described below is described as being performed by the processor 44 of the storage monitoring system 26, but the process 110 may be performed by other suitable computing devices. Although described in a particular order, which represents a particular embodiment, it should be noted that the process 110 may be performed in any suitable order. Additionally, embodiments of the process 110 may omit process blocks and/or include additional process blocks.

Referring to FIG. 6, at block 112, the processor 44 may receive a request for information associated with a good, in a generally similar manner as described with respect to block 102 of process 100. In some embodiments, the request may be an indirect request for the good as described in more detail below. At block 114, the processor 44 may identify additional goods that may be utilized with the good associated with the request. For example, after receiving the request at block 112, the processor 44 may determine whether the storage/memory 50, database 14, or both, stores information indicating one or more goods that the user may typically use with the good requested at block 112. For example, the processor 44 may query for recipes (e.g., stored in the databases 14, using a search history of the user from a web browser that was recently accessed) that use the good and retrieve the additional goods corresponding to other ingredients for the recipe. In some embodiments, the database 14 may store relationships or trends associated with the user's utilization of the good and other goods. At block 116, the processor 44 may generate and provide a recommendation indicating the additional goods to the user computing device 16. In some embodiments, a user may simply input a recipe in order to receive updates on all related goods that are known by the system 10.

As one specific implementation of the process 110, the process 110 may be utilized to locate ingredients the user is likely to use. For example, at block 112, the processor 44 may receive a request for locating a particular ingredient, such as a type of dark chocolate. At block 114, the processor 44 may determine that the dark chocolate is used in a cake that the user made previously. Accordingly, at block 116, the processor 44 may generate and provide a recommendation to the user, such as a notification displayed on the user's mobile phone (e.g., a user computing device 16), indicating the location of other ingredients of the cake.

As another specific implementation of the process 110, the user may be performing home repair tasks around the home. Accordingly, the audio device 54 of the storage monitoring system 26 may acquire audio data indicative of a particular task. At block 112, the processor 44 may receive the audio data and determine the task the user is performing, such as assembling a fan. Additionally, the database 14 may store a relationship between tasks performed by the user and goods the user may utilize to accomplish the task. As such, at block 114, the processor 44 may determine additional tools that the user may need to accomplish the task. Then, at block 116, the processor 44 may provide a notification indicating the location of the additional tools. Additionally, or alternatively, the processor 44 may output a control signal that causes the displays 48 associated with the storage monitoring system 26 to guide (e.g., by causing the display to light up) the user to the items, and thus help the user complete the task.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:
1. A system, comprising:
 a processor and memory, wherein the processor and the memory are housed within a lid configured to fit onto a storage vessel;

a tangible, non-transitory, computer-readable medium defining the memory and comprising instructions that cause the processor to:
receive an indication of a good being added to the storage vessel of a storage device;
acquire data from one or more sensors, wherein the data is indicative of storage conditions, handling conditions, or both, related to the good added to the storage vessel;
determine a shelf life of the good based on the data indicating the storage conditions, the handling conditions, or both;
generate a storage assessment output based on the shelf life; and
provide the storage assessment output to a computing device associated with the storage device.

2. The system of claim 1, wherein the processor is configured to:
receive, from the one or more sensors, an additional indication of the good being removed from the storage vessel; and
update the storage assessment based on the additional indication.

3. The system of claim 1, wherein the processor is configured to receive a request for information relating to the good subsequent to receiving the indication of the good being added to the storage vessel; and
wherein the instructions are configured to cause the processor to generate the storage assessment output based on the request.

4. The system of claim 1, wherein providing the storage assessment output comprises ordering a replacement good to replace the good.

5. The system of claim 1, wherein the instructions are configured to cause the processor to:
retrieve additional data indicating previous storage conditions, previous handling conditions, or both; and
determine the shelf life based on the data and the additional data.

6. The system of claim 1, wherein the storage assessment output comprises a recommendation to modify subsequent storage conditions, subsequent handling conditions, or both, associated with the good.

7. The system of claim 1, wherein the storage assessment output comprises an indication of one or more additional goods stored in an additional storage vessel for a user to use in conjunction with the good.

8. The system of claim 1, wherein the handling conditions comprise time stamps indicating a time duration in which the good was removed from the storage vessel; and
wherein the instructions are configured to cause the processor to determine the shelf life of the good based on the time duration.

9. The system of claim 1, wherein the instructions are configured to cause the processor to:
receive an indication of the storage device being opened based on the lid being removed from the storage vessel; and
acquire the data from the one or more sensors, wherein the data is indicative of the storage conditions, the handling conditions, or both, related to the good added to the storage vessel in response to receiving the indication of the storage device being opened.

10. A method, comprising:
identifying, via a processor, a good stored in a storage vessel;
outputting, via the processor, a control signal that causes one or more sensors to acquire data indicating storage conditions, handling conditions, or both, related to the good stored in the storage vessel;
assessing a condition of the good as spoiled based on the storage conditions, the handling conditions, or both;
determining food loss information in response to determining the condition of the good as spoiled
generating, via the processor, a storage assessment output based on the food loss information; and
providing, via the processor, the storage assessment output to a computing device of a user associated with the storage vessel and providing the food loss information to an entity distinct from the user.

11. The method of claim 10, wherein determining the condition of the good comprises determining, via the processor, whether a shelf life of the good has decreased due to the storage conditions, the handling conditions, or both; and
generating the storage assessment output in response to determining the shelf life of the good has decreased.

12. The method of claim 11, wherein determining, via the processor, the shelf life has decreased comprises:
transmitting an additional control signal to cause one or more image sensors to receive image data;
receiving the image data;
determining the shelf life based on the image data;
determining an updated shelf life based on the storage conditions, the handling conditions, or both; and
determining that the updated shelf life comprises an earlier date than the shelf life.

13. The method of claim 10, comprising receiving an indication of the storage vessel being opened; and
outputting, via the processor, the control signal that causes the one or more sensors to acquire the data indicating the storage conditions, the handling conditions, or both, related to the good stored in the storage vessel in response to receiving the indication.

14. The method of claim 10, wherein the storage conditions comprise a proximity of the good to a ripening agent source; and
wherein the storage assessment output comprises an alert to notify a user to move the good from the ripening agent source.

15. A system, comprising:
one or more sensors configured to measure data indicating storage conditions and handling conditions associated with a good stored in a storage vessel;
a processor; and
a tangible, non-transistor, computer readable medium, comprising instructions that are configured to cause the processor to:
receive an indication of a lid associated with the storage vessel being removed from the storage vessel;
output, via the processor, a control signal that causes the one or more sensors to measure the data indicating the storage conditions and the handling conditions subsequent to receiving the indication;
determine a handling condition of the good based on the data;
generate, via the processor, a storage assessment output based on the handling condition of the good and the storage conditions; and
transmit, via the processor, a control signal causing a device to provide visual feedback, audible feedback, or both, indicative of the storage assessment output.

16. The system of claim 15, wherein the processor is housed in the lid of the storage vessel.

17. The system of claim 15, where the instructions are configured to cause the processor to output a purchase request indicating a replacement for the good based on the storage assessment output.

18. The system of claim 15, wherein the instructions are configured to cause the processor to determine the handling condition of the good by:
   assessing an interior pressure of the storage vessel; and
   determining the handling condition based on the interior pressure of the storage vessel exceeding a threshold.

19. The method of claim 10, wherein the food loss information corresponds to a reimbursement claim.

20. The system of claim 1, wherein the storage assessment output corresponds to a reimbursement claim.

* * * * *